(12) United States Patent
Hiebenthal

(10) Patent No.: US 8,727,085 B2
(45) Date of Patent: May 20, 2014

(54) SEGMENTED COLLECTOR SHOE ASSEMBLY

(75) Inventor: Benjamin B. Hiebenthal, Fremont, NE (US)

(73) Assignee: Conductix, Inc., Omaha, NE (US)

( * ) Notice: Subject to any disclaimer, the term of this patent is extended or adjusted under 35 U.S.C. 154(b) by 196 days.

(21) Appl. No.: 13/398,199

(22) Filed: Feb. 16, 2012

(65) Prior Publication Data

US 2013/0213754 A1 Aug. 22, 2013

(51) Int. Cl.
*B60L 5/08* (2006.01)
*B60L 5/39* (2006.01)

(52) U.S. Cl.
USPC .......... 191/59.1; 191/49; 191/45 R; 191/58; 191/59

(58) Field of Classification Search
CPC .......... B60L 2200/26; B60L 5/08; B60L 5/20
USPC .......... 191/45 R, 47, 49, 57, 58, 59, 59.1, 60, 191/60.1, 60.4
See application file for complete search history.

(56) References Cited

U.S. PATENT DOCUMENTS

| | | | |
|---|---|---|---|
| 842,574 A * | 1/1907 | McCahon | 191/30 |
| 3,729,599 A * | 4/1973 | Payen | 191/49 |
| 3,739,108 A * | 6/1973 | Payen | 191/58 |
| 4,155,435 A * | 5/1979 | Kimura et al. | 191/58 |
| 4,428,466 A | 1/1984 | Mayer | |
| 4,464,546 A | 8/1984 | Culver | |
| 4,723,641 A | 2/1988 | Baker et al. | |
| 5,676,224 A | 10/1997 | Clarke et al. | |
| 2009/0211861 A1 | 8/2009 | Okimoto et al. | 191/59.1 |

FOREIGN PATENT DOCUMENTS

| | | | | |
|---|---|---|---|---|
| JP | 1994-066202 U | 9/1994 | | B60L 5/08 |
| JP | 2003-324806 A | 11/2003 | | B60L 5/08 |
| JP | 2005-160266 A | 6/2005 | | B60L 5/22 |
| JP | 2008-011687 A | 1/2008 | | B60L 5/08 |

\* cited by examiner

*Primary Examiner* — Mark Le
(74) *Attorney, Agent, or Firm* — Ryan T. Grace; Advent, LLP

(57) ABSTRACT

A collector shoe assembly for use with an electrified conductor rail is disclosed. A support block comprised of first and second housing members secured together which has a plurality of spaced-apart, spring-loaded collector shoe segments movably positioned therein, the outer ends of which are in engagement with the conductor rail.

19 Claims, 6 Drawing Sheets

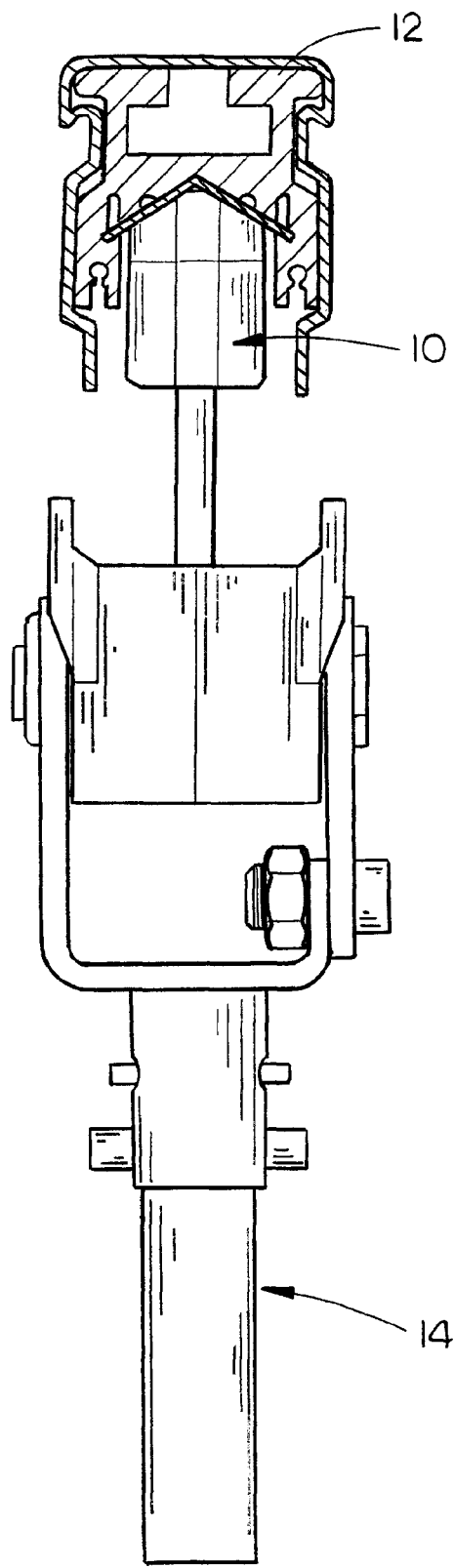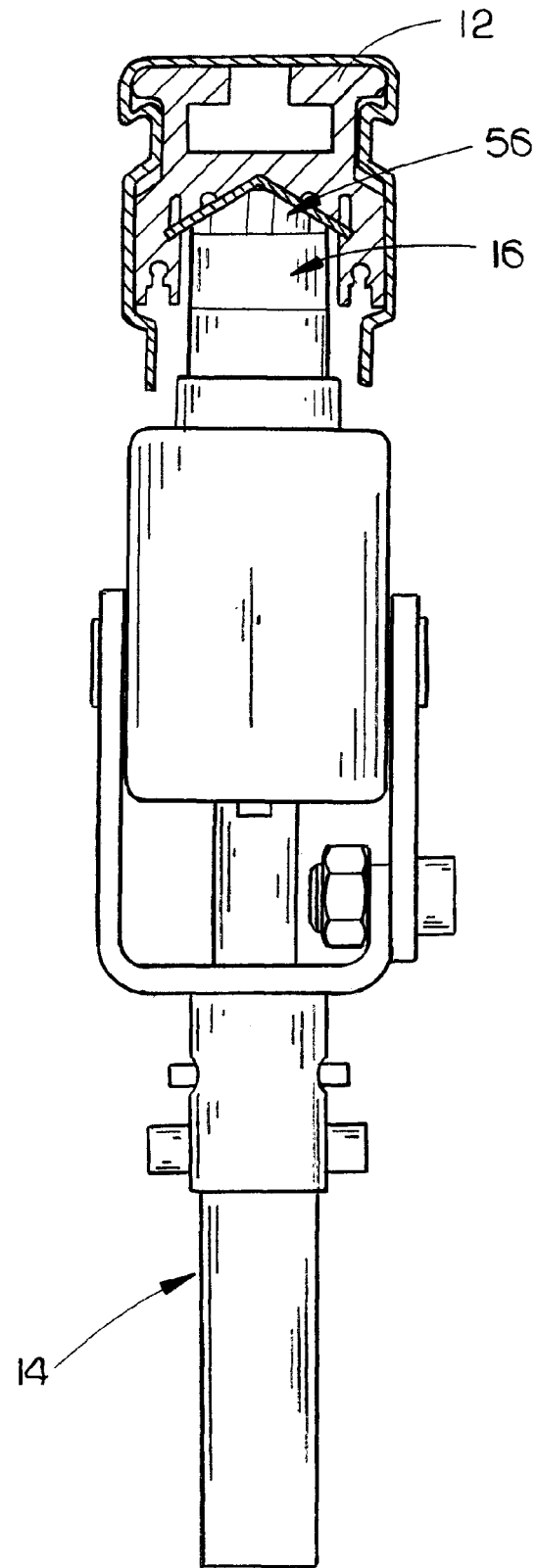
FIG. 8 (PRIOR ART)
FIG. 9

SEGMENTED COLLECTOR SHOE ASSEMBLY

BACKGROUND OF THE INVENTION

1. Field of the Invention

This invention relates to a collector shoe for use with an electrified conductor rail. More particularly, this invention relates to a segmented collector shoe assembly which includes a plurality of individually sprung collector shoe segments.

2. Description of the Related Art

Current collector shoe designs consist of a rigid collector shoe assembly mounted to a spring loaded arm. The arm is constructed such that it allows the shoe assembly to follow the conductor rail profile and adjust variations from parallel that the conductor rail may have relative to the running rail. These collector shoes are sized to have the appropriate amount of surface contact with the conductor rail to carry the electrical current required. Often they are sized for several hundred of amperes resulting in a long length of shoe.

A conductor rail cannot be manufactured perfectly straight and in some cases is required to be curved to follow the required path of the motorized equipment. When two rigid dissimilar surfaces are in contact, they will contact at the minimal number points to cause stability. Three points of contact are the minimum required for stability. The three points of contact are then subjected to a very high electrical current density causing each point to generate large amounts of heat. The heat then causes damage to the conductor rail and collector shoe ultimately resulting in shoe failure. This problem is particularly bad in installations where the equipment sits stationary for a period of time while drawing power.

A common current solution is to install multiple shoes along the rail to provide more points of contact to the conductor rail. This solution is undesirable because each shoe requires an additional mounting arm to be mounted to the equipment resulting in collector assemblies that grow incrementally in length for each collector that is installed. The long assemblies result in uneven load sharing between collectors. Also, the long collector assemblies reduce the amount of conductor rail length that can be used for movement because the space is occupied by collectors. Finally, the cost of the collector assembly is incrementally increased by the number of collectors installed.

Another problem with a rigid collector shoe is noted when it is used for signal or communication transmission while in motion. The three points of contact that were described above will continuously move from point to point and change along the collector shoe while the shoe is in motion along the conductor rail. Occasionally, as the collector shoe passes a joint in the conductor bar or even a spot of contamination or debris on the rail, the collector shoe resistance over the contact surface to the rail will rise to a point that the low voltage signal will not pass momentarily. This loss of signal can result in errors or faults between the equipment controls and drives. The typical solution is to install multiple shoes for redundancy. The intent being that at least one shoe will be making contact at any given time. The same undesirable characteristics of the multiple shoe solution apply to this situation as discussed hereinabove.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A segmented collector shoe assembly is described for use with an electrified conductor rail. The collector shoe assembly includes an elongated, generally rectangular, support block having a first end, a second end, a first side, a second side, an inner end, and an outer end. A plurality of electrical collectors are movably positioned in the support block in a spaced-apart aligned parallel manner. Each of the collectors has an inner end, an outer end, a first end, a second end, a first side, and a second side. A spring is associated with each of the collectors to yieldably urge the respective collector outwardly from the support block so that the outer end of the collector will be yieldably urged into sliding conductive engagement with the conductor rail.

In the preferred embodiment, each of the collectors has a generally rectangular cross-sectional configuration with the outer ends of the collectors being beveled. In the preferred embodiment, the support block has a plurality of spaced-apart collector compartments formed therein with the collectors being slidably mounted in the collector compartments. In the preferred embodiment, the collector shoe includes structure which limits the outward movement of the collector with respect to the support block. In the preferred embodiment, the support block is comprised of first and second housing members which are secured together in a snap-fit manner.

It is therefore a principal object of the invention to provide a segmented collector shoe assembly.

A further object of the invention is to provide a collector shoe assembly for use with an electrified conductor rail wherein the collector shoe assembly includes a plurality of segmented collector shoes which are aligned in a parallel fashion.

A further object of the invention is to provide a collector shoe assembly for use with an electrified conductor rail wherein a plurality of collector shoe segments are movably mounted in an elongated support block with each of the collector shoe segments being sprung outwardly with respect to the support block for engagement with the conductor rail.

A further object of the invention is to provide a segmented collector shoe assembly wherein the collector shoe segments are connected to a bus bar support block.

A further object of the invention is to provide a segmented collector shoe assembly which is easily mounted to a standard spring-loaded arm with the arm being secured to the mobile unit.

A further object of the invention is to provide a segmented collector shoe assembly which permits multiple contact points per collector shoe segment.

A further object of the invention is to provide a segmented collector shoe assembly wherein the same amount of current may be evenly distributed over many more contact points and in the same amount of space as a rigid collector shoe design.

A further object of the invention is to provide a segmented collector shoe assembly which distributes the current flow through many contact points which result in less heat produced at each point.

A further object of the invention is to provide a segmented collector shoe assembly which prevents damage of the shoes and conductor rail.

A further object of the invention is to provide a segmented collector shoe assembly which will provide low voltage to be transmitted along the conductor rail.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 8 is a partial sectional view illustrating the prior art collector shoe assembly in contact with a conductor rail; and FIG. 9 is a sectional view similar to FIG. 8 except that the collector shoe assembly of this invention is illustrated.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
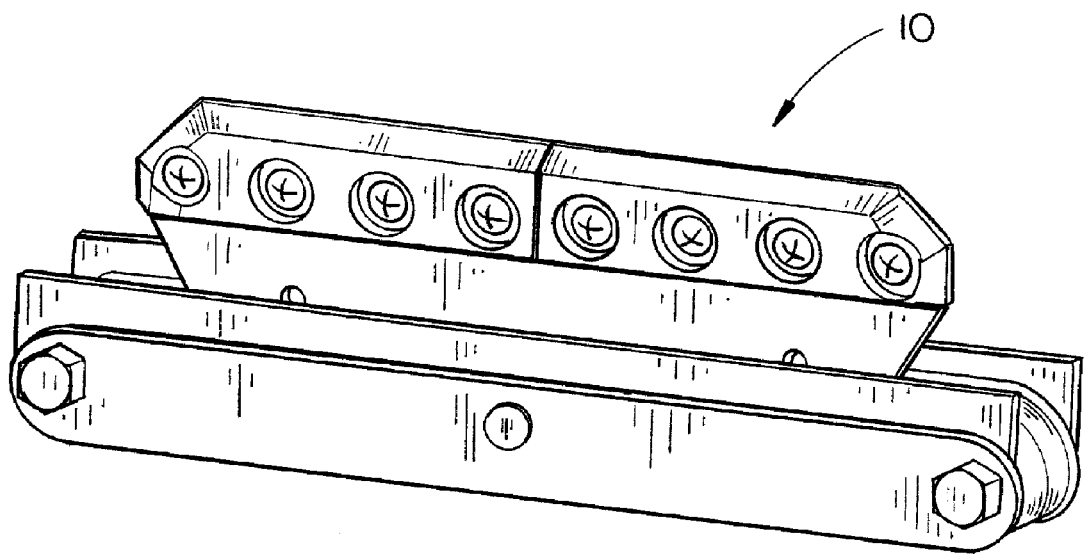
FIG. 1 is a perspective view of a prior art collector shoe assembly.
Figure 2:
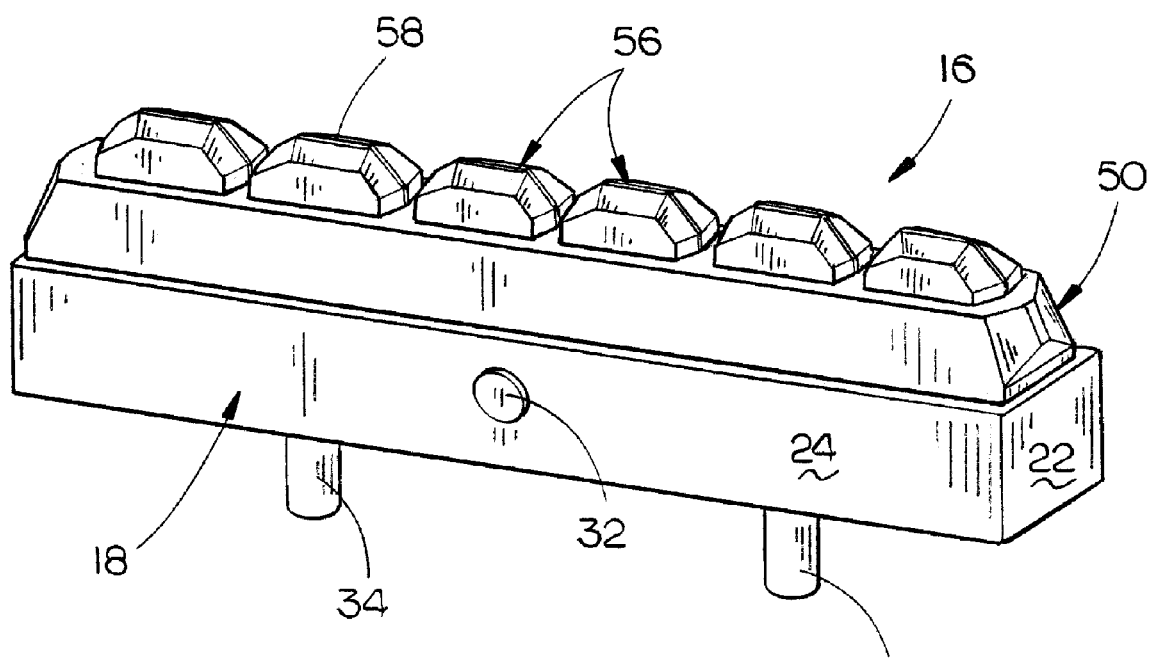
FIG. 2 is a perspective view of the segmented collector shoe assembly of this invention.

In FIG. 1, the numeral 10 refers to a prior art collector shoe which is urged into electrical contact with an electrified conductor rail 12 such as used on mobile units or vehicles such as a trolley, crane, conveyor, hoist, train, etc. The collector shoe 10 may slidably and electrically engage the underside of the conductor rail 12 or either side thereof. The collector shoes of the prior art and the collector shoe of this invention are urged into contact with the conductor rail 12 by the prior art mounting structure or spring arm 14 which is attached to the mobile unit or vehicle in conventional fashion.

The collector shoe assembly of this invention is referred to by the reference numeral 16. Assembly 16 includes an elongated, generally rectangular-shaped housing member 18. Housing member 18 includes a first end 20, a second end 22, a first side 24, a second side 26, a closed end 28 and an open end 30. A mounting boss 32 extends outwardly from side 24 for pivotal attachment to the spring arm 14. A similar boss 33 extends outwardly from side 26 of housing member 18 for pivotal attachment to the spring arm 14.

A pair of cable lugs 34 and 36 extend inwardly through openings formed in end 28 of housing member 18 which are electrically connected to a bus bar 42 by bolts 38 and 40 respectively. The rectangular, electrically conductive bus bar 42 is positioned in housing member 18 as will be described hereinafter. Screws 44 extend downwardly through holes 45 formed in bus bar 42 as will be described hereinafter. Bus bar 42 is provided with a plurality of circular recesses 46 formed therein each of which receive one end of a spring 48.

Figure 3:
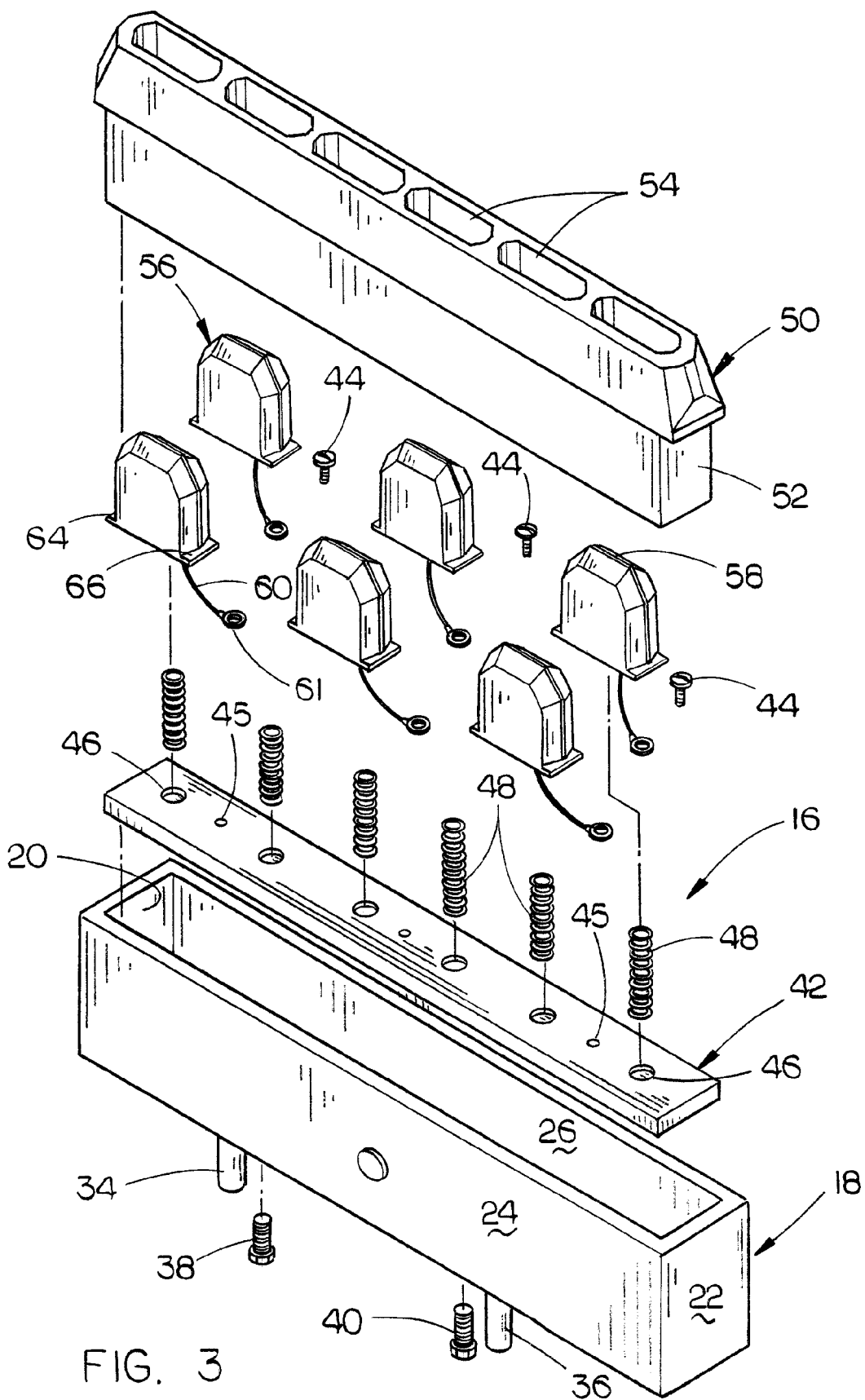
FIG. 3 is an exploded perspective view of the collector shoe assembly of this invention.
Figure 4:
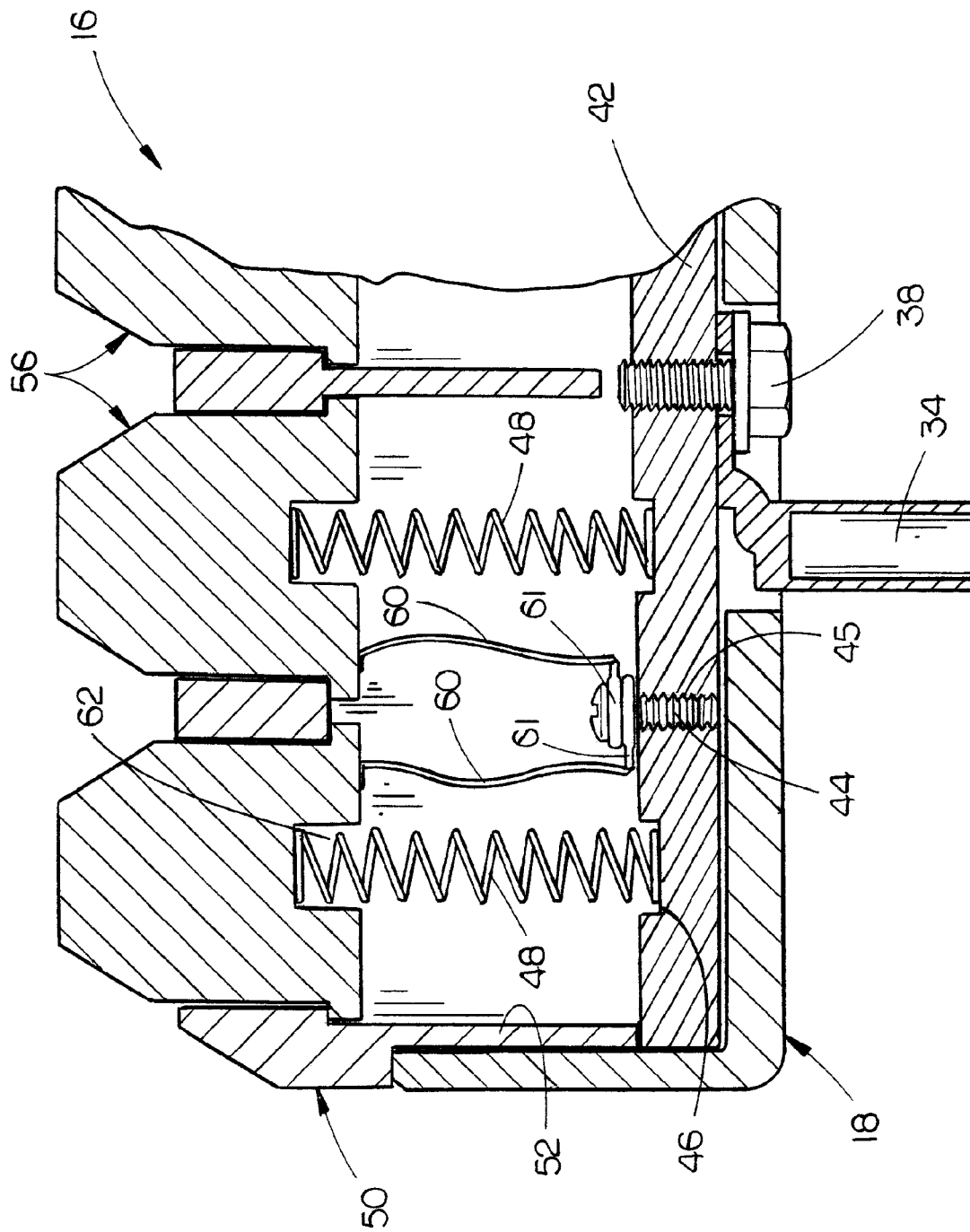
FIG. 4 is a partial sectional view of the collector shoe assembly of this invention.
Figure 5:
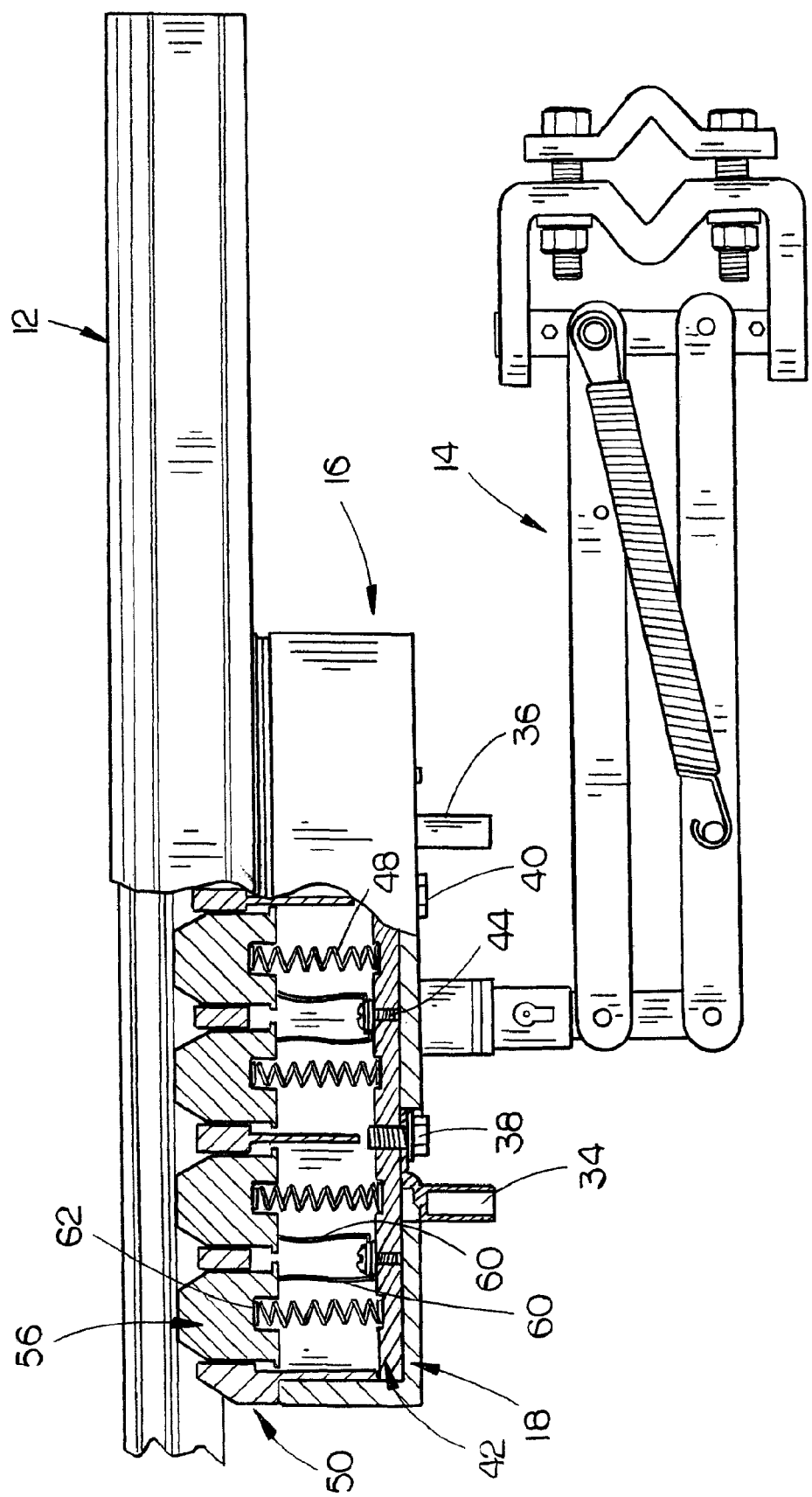
FIG. 5 is a partial sectional view illustrating the manner in which the collector shoe assembly of this invention is attached to a spring-loaded arm which is secured to the vehicle.
Figure 6:
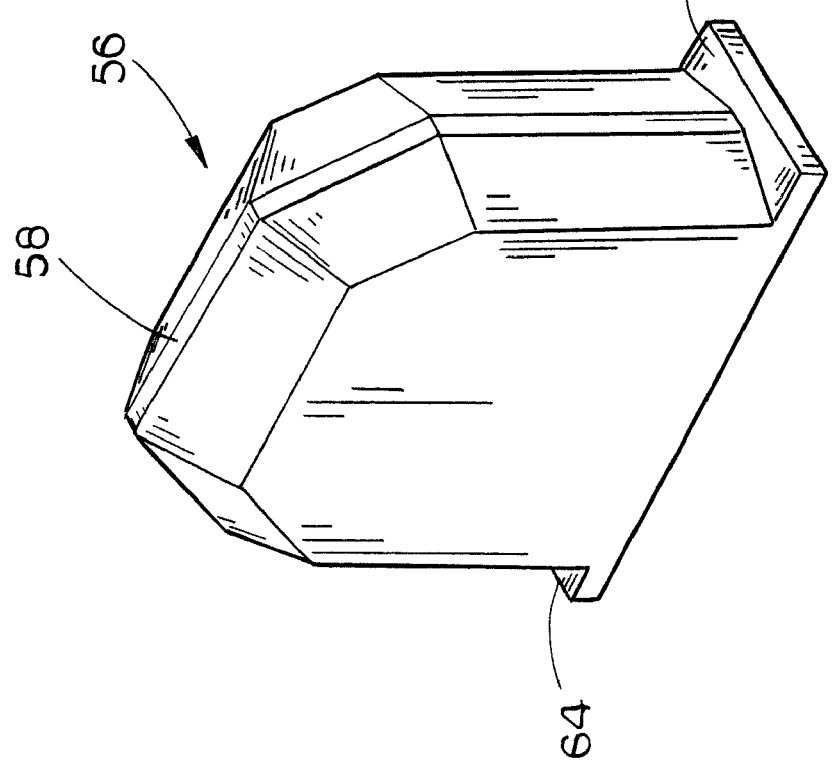
FIG. 6 is a perspective view of one form of the collector shoe segment of this invention.

Assembly 16 also includes a housing member 50 having an end portion 52 which is received by housing member 18 in a snap-fit manner. The lower end of end portion 52 engages bus bar 42 to maintain bus bar 42 in the position illustrated in FIG. 4. Housing member 50 has a plurality of collector shoe segment compartments 54 formed therein as seen in FIG. 3. An electrically conductive collector shoe segment 56 is movably positioned in each of the compartments 54. In FIG. 6, the segment 56 has beveled portions 56A and 56B at each of its ends and a beveled outer end 56C. The segment 56 includes a flat portion 58 as seen in FIG. 6. A flexible electrical lead 60 extends between each of the segments 56 and the bus bar 46 as seen in FIG. 5. Each of the leads 60 has a ring connector 61 secured thereto. A rivet or screw 44 extends through a pair of ring connectors 61 to secure the same to the bus bar 46. The outer end of each of the springs 48 is received by a recess 62 in the inner end of the respective segment 56. Each of the segments 56 has laterally extending shoulders 64 and 66 to limit the outer movement of the segments with respect to the housing member 50, as seen in FIG. 5.

Figure 7:
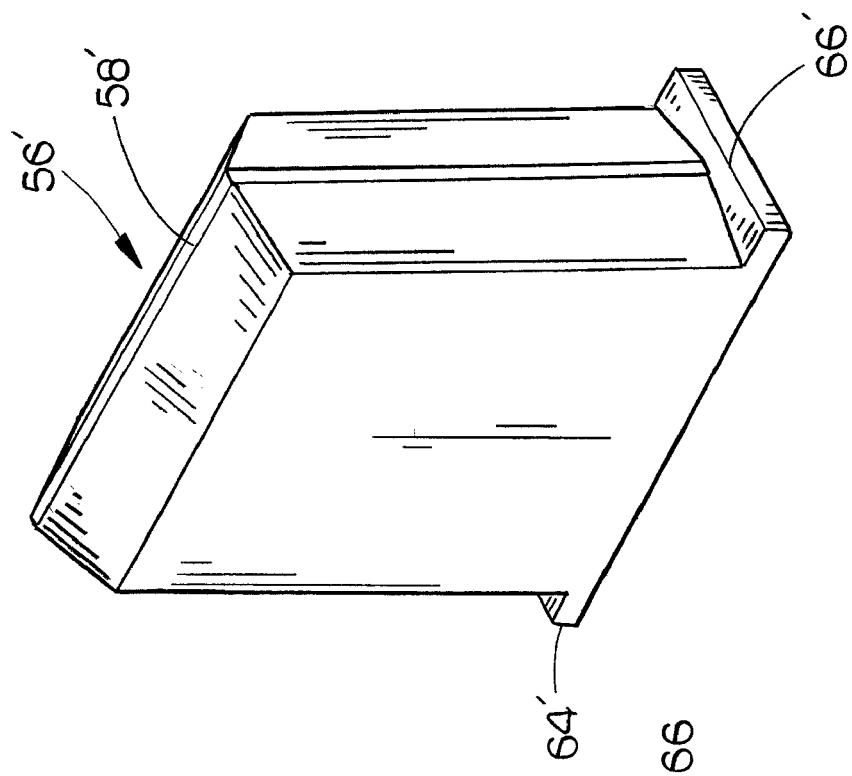
FIG. 7 is a perspective view of another form of the collector shoe segment of this invention.

As stated, FIG. 6 illustrates one form of the collector shoe segment 56. In FIG. 7, a modified form of the collector shoe segment 56' is shown. Collector shoe segment 56' has beveled ends and a beveled outer end as seen in FIG. 7. Collector shoe segment 56' also has a flat surface 58' as seen in FIG. 7.

The drawings illustrate that the shoe assembly 16 has six collector shoe segments aligned in a parallel fashion for engagement with the conductor rail 14 but that number could be increased or decreased if necessary. When the spring arm 14 yieldably urges collector shoe assembly 16 into contact with the conductor rail 12, the springs 48 individually urge the associated collector shoe segment 56 into contact with the conductor rail with the flat surfaces 58 thereof being in slidable electrical engagement with the conductor rail.

The segmented collector shoe assembly of this invention is comprised of multiple, independently sprung, collector shoes as described hereinabove. The segmented collector shoes are connected together to a bus bar in the top of the shoe housing as described above. The segmented collector shoe assembly of this invention offers a solution in a package that is the same size as the prior art shoe and mounts directly to the standard arm 14. The independently sprung collector segments provide at least three points of contact each. This better distributes the electrical load over the full length of the collector shoe resulting in a lower current density at each point of contact. The lower current density results in less heat developing at each point. In preliminary testing, the segmented shoe of this invention was able to carry double the current at the same temperature as a standard shoe of the prior art.

The multiple segmented collectors of this invention provide more contact surfaces to the conductor rail creating less variability in the contact resistance along the rail. Therefore, there is less voltage fluctuation resulting in a more dependable signal. By distributing the current through additional contact points as provided in the invention herein, results in less heat produced at each point. This keeps each point well below the melting point of the shoe material and prevents damage of the shoes and conductor rail.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A collector shoe assembly, comprising:
   a support block assembly, wherein the support block assembly includes a first housing member and a second housing member, wherein the first housing member includes an open end and a closed end, wherein the second housing member includes a first end portion received by the first housing member and a second end portion oriented on the first housing member, wherein the second housing member includes a plurality of compartments;
   a conductive bus coupled to an inside surface of the closed end of the first housing member, wherein the first end portion of the second housing member engages the conductive bus; and
   a plurality of electronic collectors movably mounted to the second housing member within the plurality of compartments to facilitate inwardly and outwardly movement of the plurality of electronic collectors with respect to the support block assembly, wherein the electronic collectors are electronically coupled to the conductive bus.

2. The collector shoe assembly of claim 1, wherein the outwardly movement of each of the plurality of electronic collectors is limited with respect to the support block assembly.

3. The collector shoe assembly of claim 1, wherein each of the plurality of electronic collectors is urged away from the closed end of the first housing member.

4. The collector shoe assembly of claim 3, wherein each of the plurality of electronic collectors is urged away from the closed end of the first housing member via a biasing member.

5. The collector shoe assembly of claim 4, wherein the biasing member is oriented between the closed end of the first housing member and a respective electronic collector of the plurality of electronic collectors.

6. The collector shoe of claim 4, wherein the biasing member is received by a recess formed in the conductive bus.

7. The collector shoe assembly of claim 1, wherein each of the electronic collectors is electronically coupled to the conductive bus via a flexible electronic lead.

8. A collector shoe assembly, comprising:
   a support block assembly, wherein the support block assembly includes a first housing member and a second housing member, wherein the first housing member includes an open end and a closed end, wherein the second housing member includes an end portion received by the first housing member, wherein the second housing member includes a plurality of compartments;
   a conductive bus coupled to an inside surface of the closed end of the first housing member, wherein the end portion of the second housing member engages the conductive bus; and
   a plurality of electronic collectors movably mounted to the second housing member within the plurality of compartments to facilitate inwardly and outwardly movement of the plurality of electronic collectors with respect to the support block assembly, wherein the electronic collectors are electronically coupled to the conductive bus.

9. The collector shoe assembly of claim 8, wherein the outwardly movement of each of the plurality of electronic collectors is limited with respect to the support block assembly.

10. The collector shoe assembly of claim 8, wherein each of the plurality of electronic collectors is urged away from the closed end of the first housing member.

11. The collector shoe assembly of claim 10, wherein each of the plurality of electronic collectors is urged away from the closed end of the first housing member via a biasing member.

12. The collector shoe assembly of claim 11, wherein the biasing member is oriented between the closed end of the first housing member and a respective electronic collector of the plurality of electronic collectors.

13. The collector shoe of claim 11, wherein the biasing member is received by a recess formed in the conductive bus.

14. The collector shoe assembly of claim 8, wherein each of the electronic collectors is electronically coupled to the conductive bus via a flexible electronic lead.

15. A collector shoe assembly, comprising:
   a support block assembly, wherein the support block assembly includes a first housing member and a second housing member, wherein the first housing member includes an open end and a closed end, wherein the second housing member includes a first end portion received within the first housing member and a second end portion oriented on the upper portion of the first housing member, wherein the second housing member includes a plurality of compartments;
   a conductive bus coupled to an inside surface of the closed end of the first housing member, wherein the first end portion of the second housing member engages the conductive bus;
   a plurality of electronic collectors movably mounted to the second housing member within the plurality of compartments to facilitate inwardly and outwardly movement of the plurality of electronic collectors with respect to the support block assembly, wherein each of the plurality of electronic collectors is urged away from a closed end of the first housing member; and
   a plurality of flexible electronic leads electrically coupling the conductive bus to a respective electronic connector.

16. The collector shoe assembly of claim 15, wherein the outwardly movement of each of the plurality of electronic collectors is limited with respect to the support block assembly.

17. The collector shoe assembly of claim 15, wherein each of the plurality of electronic collectors is urged away from the closed end of the first housing member via a biasing member.

18. The collector shoe assembly of claim 17, wherein the biasing member is oriented between the closed end of the first housing member and a respective electronic collector of the plurality of electronic collectors.

19. The collector shoe of claim 17, wherein the biasing member is received by a recess formed in the conductive bus.

* * * * *